United States Patent [19]
Foran et al.

[11] Patent Number: 5,742,749
[45] Date of Patent: Apr. 21, 1998

[54] METHOD AND APPARATUS FOR SHADOW GENERATION THROUGH DEPTH MAPPING

[75] Inventors: James L. Foran, Milpitas; Rolf A. van Widenfelt, San Francisco, both of Calif.

[73] Assignee: Silicon Graphics, Inc., Mountain View, Calif.

[21] Appl. No.: 603,691

[22] Filed: Feb. 20, 1996

Related U.S. Application Data

[63] Continuation of Ser. No. 89,799, Jul. 9, 1993, abandoned.

[51] Int. Cl.$^6$ .................................................. G06T 11/40
[52] U.S. Cl. ............................................ 395/126; 395/130
[58] Field of Search ............................ 395/122, 125–130; 345/139

[56] References Cited

U.S. PATENT DOCUMENTS

| | | | |
|---|---|---|---|
| 4,586,038 | 4/1986 | Sims et al. | 395/130 |
| 4,709,231 | 11/1987 | Sakaibara et al. | 395/126 |
| 4,727,365 | 2/1988 | Bunker et al. | 345/139 |
| 4,807,158 | 2/1989 | Blanton et al. | 395/125 |
| 4,821,212 | 4/1989 | Heartz | 395/126 |
| 4,845,651 | 7/1989 | Aizawa et al. | 395/125 |
| 4,928,250 | 5/1990 | Greenberg et al. | 395/126 |
| 4,943,938 | 7/1990 | Aushima et al. | 395/122 |
| 5,025,405 | 6/1991 | Swanson | 395/126 X |
| 5,083,287 | 1/1992 | Obata et al. | 395/126 |
| 5,179,638 | 1/1993 | Dawson et al. | 395/130 X |
| 5,224,208 | 6/1993 | Miller, Jr. et al. | 395/130 X |
| 5,239,624 | 8/1993 | Cook et al. | 395/125 |

(List continued on next page.)

OTHER PUBLICATIONS

"Computer Graphics Principles and Practices, Second Edition", Foley et al., Addison–Wesley Publishing Company, pp. 745–756.

"Casting Curved Shadows on Curved Surfaces", Williams, Proceedings of SIGGRAPH '78, pp. 270–274.

"The RenderMan Companion", Steve Upstill, Addison–Wesley Publishing Company, 1990.

"Fast Shadows and Lighting Effects Using Texture Mapping", Segal, et al., Computer Graphics, 26, 2, Jul. 1992, pp. 249–252.

Peachey, Darwyn R., "Solid Texturing of Complex Surfaces", Siggraph, vol. 19, No. 3, pp. 279–286 (Jul. 22–26, 1985).

"High–Performance Polygon Rendering", Kurt Akeley & Tom Jermoluk, Computer Graphics, vol. 22, No. 4, Aug. 1988.

*Primary Examiner*—Anton W. Fetting
*Attorney, Agent, or Firm*—Blakely, Sokoloff, Taylor & Zafman

[57] ABSTRACT

A method and apparatus for creating shadowed scenes for interactive image generation. Shadowing is effected by generation of a shadowing coefficient for each pixel, which is then used when the scene is rendered. The present invention utilizes z-buffer and projective texture mapping facilities of an image generation system. Generation of the shadow coefficient is achieved by the steps of: rendering the scene from the viewpoint of a light source using z-buffering to create a two dimensional depth map from said z-buffer; storing the depth map in texture mapping storage; rendering the scene from the viewpoint of the viewer; for every pixel in view creating an index info said depth map and a iterated depth value; retrieving a predetermined number of depth map samples from the depth map based on the position of a depth map index; comparing said iterated depth value with each of the depth map samples to determine which of the depth map samples are in shadow; creating a weighted average shadow coefficient from the results of the comparisons; and using the shadow coefficient for rendering. Optionally, the values in the depth map are offset by an amount dependent on the slope of the distance function relative to the depth map indices. The scene is then rendered utilizing surfaces and/or shading information. The shadow coefficient is used to calculate the pixel intensity thus creating realistic shadow effect.

26 Claims, 10 Drawing Sheets

U.S. PATENT DOCUMENTS

| | | | |
|---|---|---|---|
| 5,268,996 | 12/1993 | Steiner et al. | 395/126 |
| 5,282,262 | 1/1994 | Kurashige | 395/126 |
| 5,305,430 | 4/1994 | Glassner | 395/127 |
| 5,307,450 | 4/1994 | Grossman | 395/130 X |
| 5,317,689 | 5/1994 | Nack et al. | 395/505 |
| 5,321,797 | 6/1994 | Morton | 395/131 |
| 5,325,471 | 6/1994 | Inoue | 395/127 |
| 5,325,472 | 6/1994 | Horiuchi et al. | 395/127 |
| 5,333,245 | 7/1994 | Vecchione | 395/130 |
| 5,345,541 | 9/1994 | Kelley et al. | 395/130 X |
| 5,361,386 | 11/1994 | Watkins et al. | 395/130 |
| 5,363,477 | 11/1994 | Kuragano et al. | 395/126 |
| 5,367,615 | 11/1994 | Economy et al. | 395/129 |
| 5,469,535 | 11/1995 | Jarvis et al. | 395/130 |
| 5,537,638 | 7/1996 | Morita et al. | 395/130 X |

METHOD AND APPARATUS FOR SHADOW GENERATION THROUGH DEPTH MAPPING

This is a continuation of application Ser. No. 08/089,799, filed Jul. 9, 1993, now abandoned.

BACKGROUND OF THE INVENTION

1. Field of the Invention

The present invention relates to the field of computer generated graphics, in particular the generation of three-dimensional shadowed scenes.

2. Prior Art

The addition of shadows to the rendering of a complex model can greatly enhance the understanding of that model's geometry. The human visual system uses shadows as a cue for depth and shape. Consequently, shadows are very useful for conveying the three dimensional nature of rendered objects and for adding realism to computer generated scenes.

Generally, shadowing is similar to hidden surface removal. In hidden surface removal, objects or portions thereof are obscured because they are behind another object. For hidden surface removal, the point of reference for determining if an object is obscured is a viewing point. For shadowing, objects or portions thereof are obscured because they are in the shadow of another object. In the shadowing case, the point of reference for determining if an object is obscured is a source light point.

Various techniques for generating shadowing effects are described in the publication "Computer Graphics Principles and Practices, Second Edition", Foley et al., Addison-Wesley Publishing Company, pp 745-756. One such technique, described in an article entitled "Casting Curved Shadows on Curved Surfaces", Williams, Proceedings of SIGGRAPH '78, pp. 283-291, 1978, uses two passes. In a first pass, a shadow map is created. The shadow map is analogous to a z-buffer (which is commonly used for hidden surface removal) having the light source as the point of projection. In this case, the shadow map identifies the distances from the light source to the objects comprising the scene being rendered. The shadow map is created in a three-dimensional (x,y,z) light coordinate system having the light source as the origin. The x,y coordinates of the light system coordinate are used to index the shadow map. In a second pass, the scene is rendered from the viewpoint of the viewer. This is typically done in a three dimensional coordinate system having the viewpoint as the origin (e.g. a eye coordinate system). During this second pass, whenever the object pixel is determined to be in view, a test is made to determine if it is in shadow. This is done by first transforming the object pixel from clip system coordinates to light system coordinates. As noted above, the light system coordinates include indices into the shadow buffer, as well as a depth coordinate. The indexed value in the shadow buffer is then compared to the depth coordinate. If the depth coordinate is farther from the light source than the value in the shadow map, there is something blocking the light source from the point, and the pixel is shaded as being in shadow; otherwise the point is visible from the light source and it is shaded as lit.

A first problem with this technique is the necessity to perform a computation in order to transform object pixels from clip system coordinates to light system coordinates during the second pass. For the generation of interactive images, it is desirable to minimize such computations. Otherwise, interactive manipulation of an image can result in unacceptable delays in the rendering of the image.

A second problem with this technique is that various artifacts tend to be generated causing various distortions in the shadowed image. An improvement to the basic technique described by Williams is termed percentage closer filtering. Percentage closer filtering was described in an article entitled "Rendering Antialiased Shadows with Depth Maps", Reeves, Salesin, and Cook, Proceedings of SIGGRAPH '87, pages 283-291, 1987. In percentage closer filtering, each depth coordinate is compared to a predetermined region of the shadow map, and the percentage of closer values is used to determine an amount of shadowing for a pixel. While percentage closer filtering is an improvement, various artifacts and distortions remain.

Thus, it is a primary object of the present invention to provide a shadowing technique that may be used for interactive image generation.

SUMMARY

A method and apparatus for creating shadowing effects in a three dimensional scene as part of an interactive image generation process, is described. Shadows are very useful for conveying the three dimensional nature of the rendered objects and for adding realism to the computer generated scene. The present invention incorporates elements of z-buffering and projective texture mapping to create the shadow effect.

The principle steps to achieve the shadow effect are as follows: rendering the scene from the viewpoint of a light source using z-buffering to create a two dimensional depth map from said z-buffer; storing the depth map in texture mapping storage; rendering the scene from the viewpoint of the viewer; for every pixel in view creating an index into said depth map and a depth value; retrieving a predetermined number of depth map samples from the depth map based on depth map index; comparing said depth value with each of the depth map samples to determine which of the depth map samples shadows the rendered pixel and creating a weighted average shadow coefficient from the results of the depth map comparisons; and storing the shadow coefficient for later rendering. The scene is then rendered utilizing surfaces and/or shading information. When the object points are rendered the calculated pixel intensity is modified as a function of the shadow coefficient thus creating a realistic shadow effect.

Optionally, the values in the depth map are offset by an amount dependent on the slope of the distance function relative to the depth map indices. Further, the scene may be further rendered utilizing a texture corresponding to the beam cross section of the light source to achieve a spotlight effect. As part of this process the light source to object distance function may be used to attenuate the light intensity due to distance and atmospheric effects.

The shadow generation process can be repeated for multiple light sources with optimizations possible for reducing the total number of rendering passes. When the scene is redrawn the shadow depth maps need not be redrawn if only the viewer is moving relative to the scene objects and light sources.

DETAILED DESCRIPTION OF THE PREFERRED EMBODIMENT

A method and apparatus for interactive generation of shadowed scenes is described. In the following description, numerous specific details are set forth such as iteration of non-projected textures, in order to provide a thorough understanding of the present invention. It will be apparent, however, to one skilled in the art that the present invention may be practiced without such specific details. In other instances, specific implementation details such as circuitry for performing well known arithmetic functions have not been shown in detail in order not to unnecessarily obscure the present invention.

OVERVIEW OF A COMPUTER CONTROLLED GRAPHICS SYSTEM IN THE PREFERRED EMBODIMENT

Figure 1:
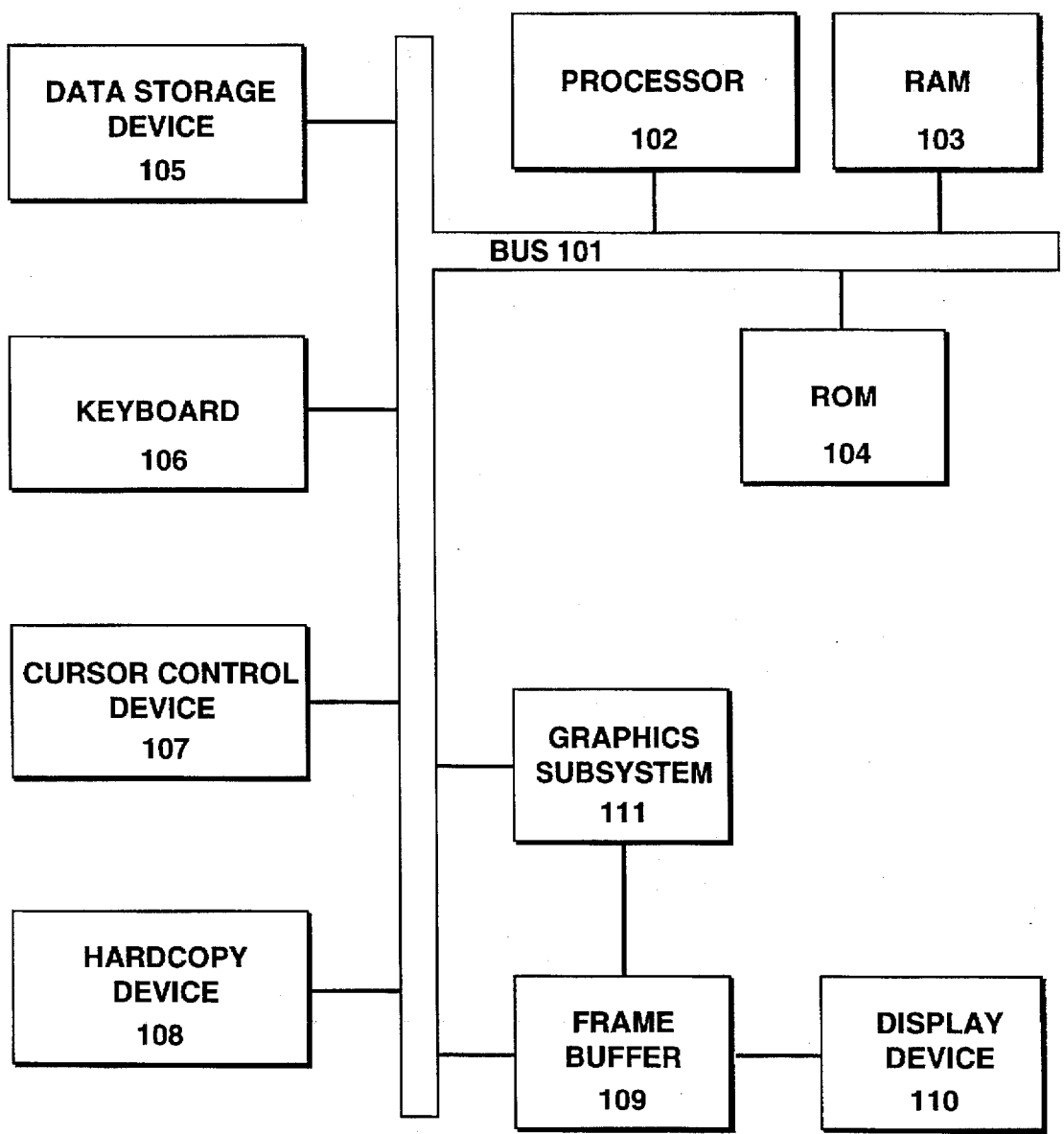
FIG. 1 is a block diagram of a computer system in which the currently preferred embodiment of the present invention may be implemented.

The computer controlled graphics system of the preferred embodiment is described with reference to FIG. 1. The present invention is implemented for use on a computer controlled graphics system for generating three dimensional images such as one of the members of the IRIS® family of systems available from Silicon Graphics, Inc. of Mountain View, Calif. Generally, the present invention may be implemented on any computer controlled graphics system which performs z-buffering for hidden surface removal and perspective correct texture mapping. In any event, a computer system as may be utilized by the preferred embodiment generally comprises a bus structure or other communication means 101 for communicating information between the various components of the computer system, a processor means 102 coupled with said bus 101 for processing information, a random access memory (RAM) or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a data storage device 105, such as a magnetic disk and disk drive, coupled with said bus 101 for storing information and instructions, an alphanumeric input device 106 including alphanumeric and other keys coupled to said bus 101 for communicating information and command selections to said processor 102, a cursor control device 107, such as a mouse, track-ball, cursor control keys, etc., coupled to said bus 101 for communicating information and command selections to said processor 102 and for controlling cursor movement. Additionally, it is useful if the system includes a hardcopy device 108, such as a printer, for providing permanent copies of information. The hardcopy device 108 is coupled with the processor 102 through bus 101.

Also coupled to the computer system of the preferred embodiment is a frame buffer 109 which is furrier coupled to a display device 110, preferably a display device capable of displaying high resolution color or monochrome graphical images. The frame buffer 109 contains the pixel data for driving the display device 110. The display device 110 is coupled to a graphics subsystem 111. The graphics subsystem 111 is used to generate the pixel data stored in the frame buffer 109. The graphics subsystem 111 is coupled to the bus 101 for communication with the processor 102 and frame buffer 109. In other embodiments the graphics subsystem 111 may be implemented to include the frame buffer 109.

The graphics subsystem 111 in the currently preferred embodiment would also include a storage means, e.g. a Dynamic Random Access memory (DRAM), for storing one or more texture maps. The graphics subsystem 111 would further include processing means for performing perspective correct texture mapping, i.e. per pixel divisions, during the rendering process and z-buffering. The graphics subsystem 111 would further include processing elements for transforming between coordinate systems, generating shadow coefficients and for other processing needs of the present invention.

Overview Of The Rendering Process Implemented By The Graphics Subsystem of the Currently Preferred Embodiment of the Present Invention The processor of the preferred embodiment provides the graphics subsystem 111 with the visual description of 3D objects. This visual description takes the form of drawing commands and world coordinate vertex data. The world coordinate system is the coordinate system in which the 3D objects are described. The visual description describes the object's geometric position, color, and surface normal vectors used for complex lighting calculations. The graphics architecture of the currently preferred embodiment of the present invention performs transformations and other graphics operations to calculate specific pixel values for each of the pixels on display device 110. Object data from the processor is processed by four pipelined subsystems before being displayed on the screen: 1) a geometry subsystem, 2)

a scan conversion subsystem, 3) a raster subsystem, and 4) a display subsystem.

The geometry subsystem receives 32-bit or 64-bit graphical data from the processor and converts it to screen-space data. Screen-space data defines an object's positions in a screen coordinate system corresponding to the visible plane of the display monitor screen. The scan conversion subsystem then breaks down points, lines, polygons and meshes thereby producing pixel data. This pixel data is sent to the raster subsystem where a z-buffer removes hidden surfaces. The raster subsystem also performs various blending and texturing functions on a pixel-by-pixel basis as the pixels are written to image bit-planes, or a frame buffer. Finally, the display subsystem reads the frame buffer and displays the image on a color monitor.

Parallelism is exploited extensively throughout the present invention graphics architecture. The multiple-instruction, multiple-data (MIMD) organization of the geometry subsystem allows up to twelve (12) primitives to be processed concurrently. The MIMD organization of the scan conversion and raster subsystem allows up to 320 million pixels to be processed per second.

The graphics subsystem of the present invention uses four-megabit DRAMs to construct a high-resolution frame buffer with configurations ranging from 256 through 1024 bits per pixel. This high capacity allows storage of color, depth, and numerous other special-purpose data fields to support advanced rendering features.

Within the above described architecture of the currently preferred graphics subsystem, aspects of the present invention may be implemented in the scan conversion subsystem and the raster subsystem. For example, the entire process for generating shadows may be fully incorporated within the raster subsystem. Alternatively the functionality may be split between the two subsystems. Such alternative implementations would be apparent to one skilled in the art and would not cause a departure from the spirit and scope of present invention.

As will be described in more detail below a depth map is created that is stored in texture map storage, and which is accessed using a projective texture mapping system. Further, if a projected spotlight effect is desired, a cross section of light as a texture map may be utilized. However, various aspects of the present invention may be implemented in shadow generation systems that do not incorporate projective texture mapping. In any event, the advantages of using projective texture mapping to create shadows will become apparent in the following description.

Projective Texture Mapping

The currently preferred embodiment of the present invention utilizes a projective texture mapping facility as described in co-pending application Ser. No. 08/089,801 entitled "A METHOD AND APPARATUS FOR PROTECTIVE TEXTURE MAPPING RENDERED FROM ARBITRARILY POSITIONED AND ORIENTED LIGHT SOURCE," filed on Jul. 9, 1993 and assigned to the same assignee of the present invention.

Producing an image of a three-dimensional scene requires finding the projection of that scene and re-projecting the same onto a two-dimensional screen. In the case of a scene consisting of texture mapped surfaces, this involves not only determining where the projected points of the surfaces should appear on the screen, but also which portions of the texture image should be associated with the projected points.

The projected texture mapping facility utilized by the currently preferred embodiment of the present invention generates texture map coordinates based on a variably positioned projection point. The effect is to project the textures onto an object in a scene being rendered, e.g. like projecting a slide onto the side of a building. In the currently preferred embodiment, texture map coordinates are generated for objects (geometric primitives) vertex points. Subsequent texture coordinates are generated through interpolation in the iteration process.

If the image of a three-dimensional scene is to appear realistic, then the projection from three to two dimensions must be a perspective projection. A perspective projection requires a division operation be performed to obtain texture map coordinates. Typically, a complex scene is converted to polygons before projection. The projected vertices of these polygons determine boundary edges of projected polygons. Scan conversion uses iteration to enumerate pixels on the screen that are covered by each polygon. This iteration in the plane of projection introduces a homogenous variation into the parameters (texture coordinates) that index the texture map of a projected polygon. If the homogenous variation is ignored in favor of a simpler linear iteration, incorrect images are produced that can lead to objectionable effects such as texture "swimming" during scene animation. Correct interpolation of texture coordinates requires each coordinate to be divided by a common denominator for each pixel of a projected texture mapped polygon. As will become apparent in the description below, a difference from existing techniques is the generalization of the value of the divisor.

Figure 2:
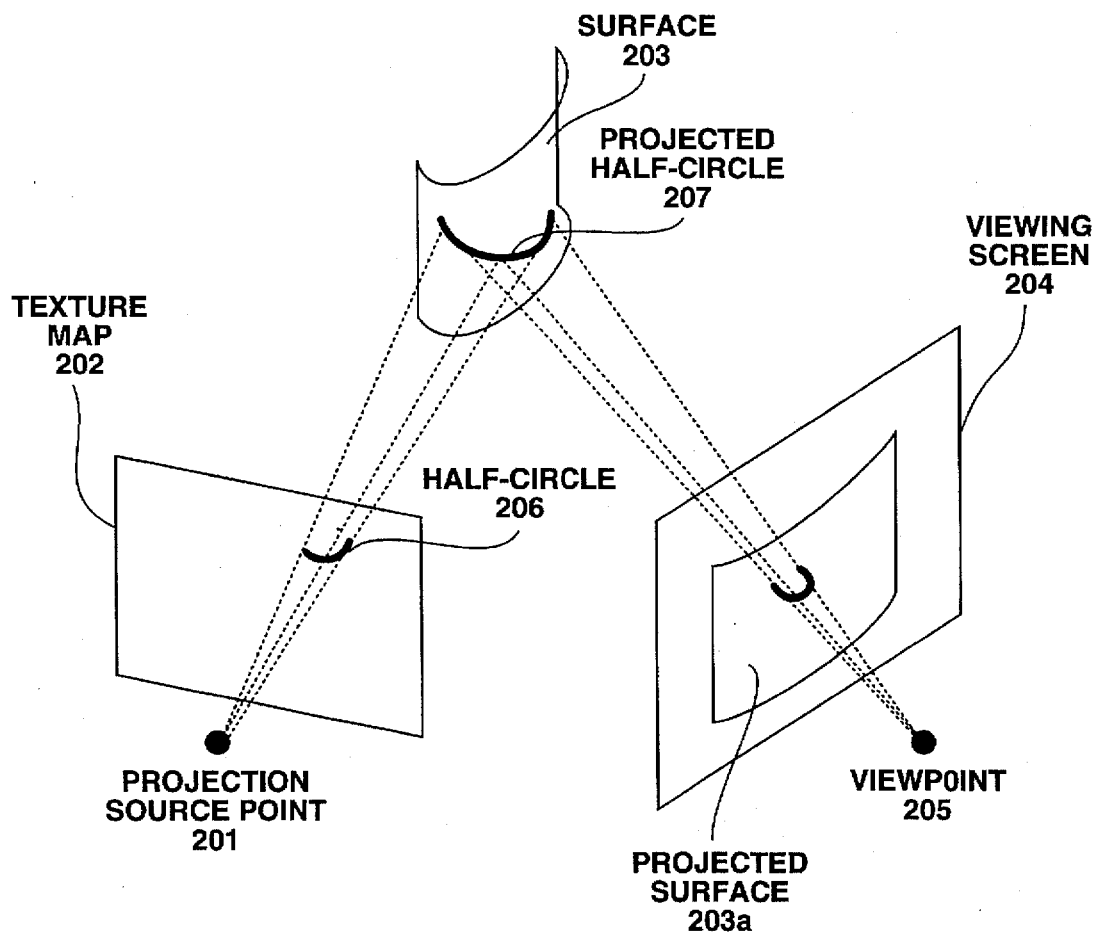
FIG. 2 is a diagram illustrating the concepts of projecting a texture map into a scene and reprojecting the scene onto a viewing screen as performed in the currently preferred embodiment of the present invention.

The projective texture mapping utilized in the currently preferred embodiment provides for arbitrary projection of a texture map onto a surface being rendered. As described above, the texture map is projected into a scene and thus onto objects comprising the scene. Subsequently, the scene is projected onto a viewing screen. FIG. 2 illustrates these basic concepts. Referring to FIG. 2, a texture map 202 is projected onto a surface 203 relative to a projection source point 201. The texture map 202 and projection source point 201 have an arbitrary relationship at arbitrary points in three dimensional space. This provides for scaling and for perspective views of the texture map 202 onto the surface 203. A half-circle 206 on texture map 202 is projected onto surface 203 to create projected half circle 207. So if the texture map 202 and projection source point 201 are re-positioned, the half-circle 207 would move correspondingly.

To create the visual image, the surface 203 is then projected onto a viewing screen 204 relative to a viewpoint 205. Illustrated on the viewing screen 204 is the projected surface 203a.

Generation of Projected Texture Map Coordinates

A texture map is addressed by s and t indexes. In the currently preferred embodiment of the present invention, the s and t indexes of the texture map are defined at a reference plane that is a unit distance from a variably positioned projection source point. The direction of projection from the projection source point is denoted as q. The texture is projected into the environment such that s and t are multiplied by the q coordinate of the vertices of the scene objects. The system (sq, tq, q) forms an orthogonal coordinate system in three space which can be generated by a linear transformation of the (x,y,z) system of the scene objects.

When iteration of a coordinate for a non-projected texture takes place in the viewer's coordinate system the depth coordinate is renamed w instead of z. Since the transformation of the viewer's 3D coordinate system to the screen is a reverse projection, x and y are divided by w to obtain screen coordinates. When textures are defined purely in two dimensions it is necessary to account for the reverse projection. For that reason s and t are divided by w, so that quantities s/w, t/w, and l/w are iterated. These quantities are referred to as homogeneous texture coordinates. At each pixel the first two quantities are divided by the third to yield correct s and t values to index the texture map.

Iteration of projected textures is similar. It is identical to that for a non-projected texture above except that the iterated quantities are sq/w, tq/w and q/w. Angular attenuation is encompassed in the texture since the texture is defined at a plane that is one unit distance from the projection source point. It is this one unit distance that may be changed to cause the scaled projected texture. Attenuation due to distance is then a multiplication of the indexed value by some function of object distance from the projection source point along the q direction.

The iteration process is now described. To aid in the description, five coordinate systems are introduced: the eye, clip, screen, light and texture coordinate systems. The eye coordinate system is a three dimensional coordinate system originating at the eye and oriented along the line of sight of the viewer. The dip coordinate system is a homogeneous representation of three-dimensional space, with x, y, z, and w coordinates. The origin of this coordinate system is a point termed the viewpoint. The term dip coordinate system is used because it is this system in which clipping is often carried out. The screen coordinate system represents the two-dimensional screen upon which a scene is projected. The screen coordinates are obtained from eye coordinates by dividing x and y by w, so that the screen coordinates are given by $x^s=x/w$ and $y^s=y/w$ (the s superscript is used to indicate screen coordinates).

The light coordinate system is a second homogeneous coordinate system with coordinates $x^1$, $y^1$, $z^1$, and $w^1$ (the 1 superscript is used to indicate light coordinates and $w^1$ corresponds to q as referred to above). The origin of the light coordinate system is at the light source, i.e. the projection source point. Finally, the texture coordinate system corresponds to a texture map. Texture coordinates are obtained from light coordinates by dividing $x^1$ and $y^1$ by $w^1$, so that $x^t=x^1/w^1$ and $y^t=y^1/w^1$ (that superscript is used indicate texture coordinates).

Given $(x^s, y^s)$ a point on a scan-converted polygon, the goal is to find its corresponding texture coordinates, $(x^t, y^t)$.

Figure 3:
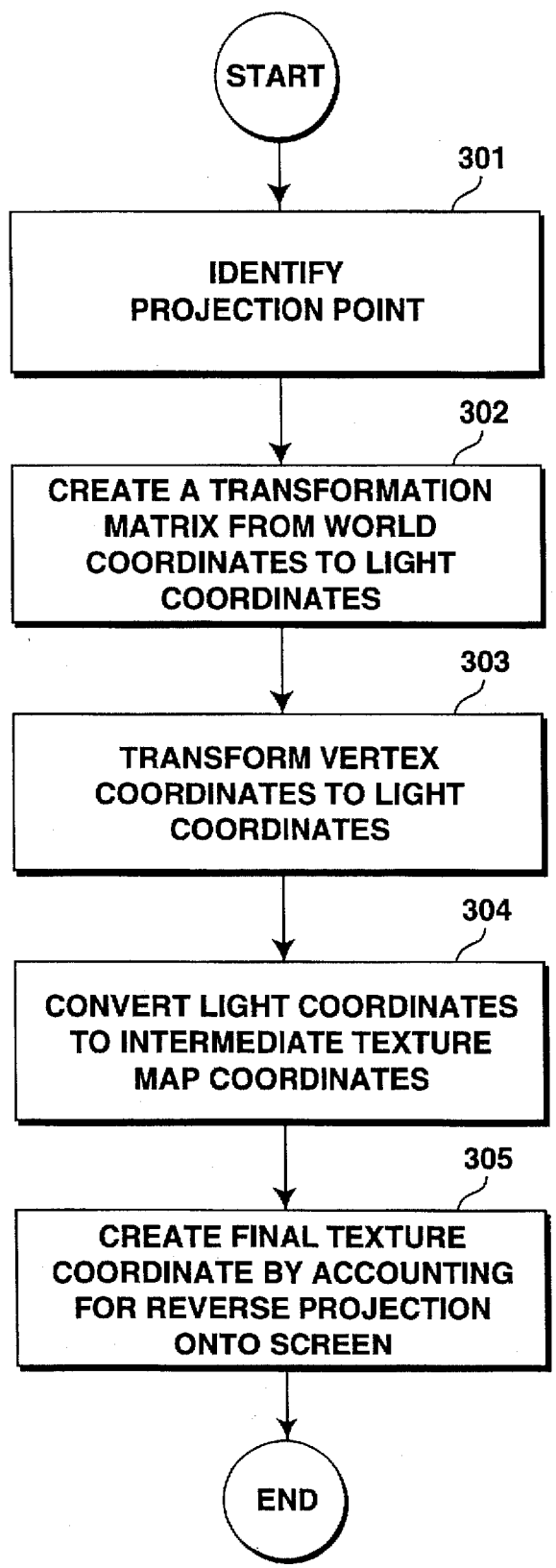
FIG. 3 is a flowchart illustrating the steps for generating a texture map coordinate as may be performed in the currently preferred embodiment of the present invention.

FIG. 3 illustrates and summarizes the steps for generating texture map coordinates for geometric primitive vertex points as performed in the present invention. Referring to FIG. 3, the projection source point is identified, step 301. As noted above, the projection source point may be variably positioned and acts as the origin for the light coordinate system. In order to readily create coordinates in the light system from vertex points of the geometric primitive, a transformation matrix is created, step 302. Essentially, the steps 301 and 302 are set-up functions which are performed for the rendering of a particular scene. Each of the remainder of the steps are performed for each vertex point of a geometric primitive.

When a vertex point is received for processing during scan conversion, the vertex coordinates in the world system are transformed into light coordinates i.e. $(x^1, y^1, w^1)$, step 303. The light coordinates are than converted into intermediate texture map coordinates i.e. $(x^1/w^1, y^1/w^1)$, step 304. As noted above, texture map coordinates are derived by merely dividing the linear x and y coordinates by the direction coordinate. The steps 303 and 304 effectively cause projection of the texture map into the scene being rendered. In order to account for the reverse projection of the rendered scene into a viewing screen, a final texture coordinate corresponding to the screen point is created by a division of the intermediate texture coordinates by the depth coordinate in the clip system, i.e., $$\frac{x^1/w}{w^1/w}, \frac{y^1/w}{w^1/w}$$

step 305.

Figure 4:
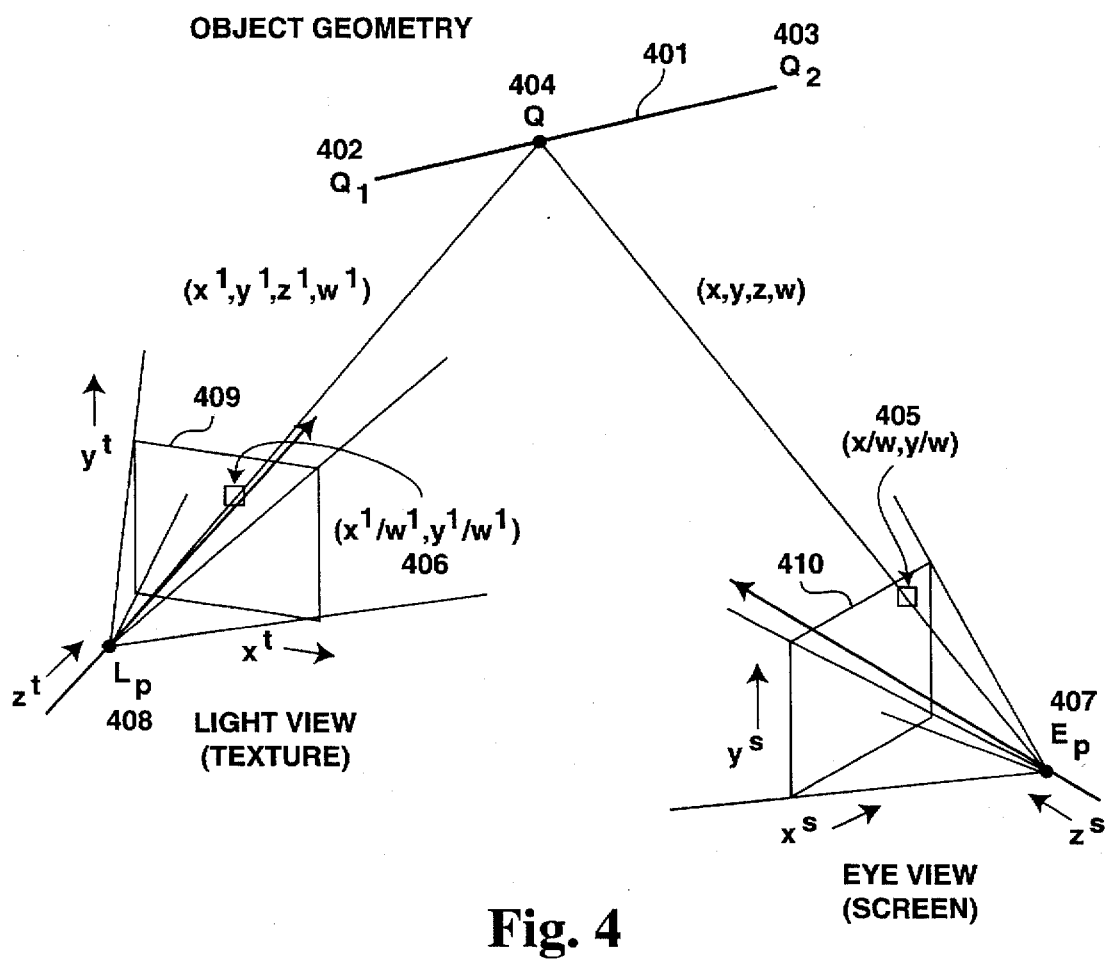
FIG. 4 is a diagram illustrating clip, screen, light and texture coordinate systems as utilized in the currently preferred embodiment of the present invention.
Figure 5:
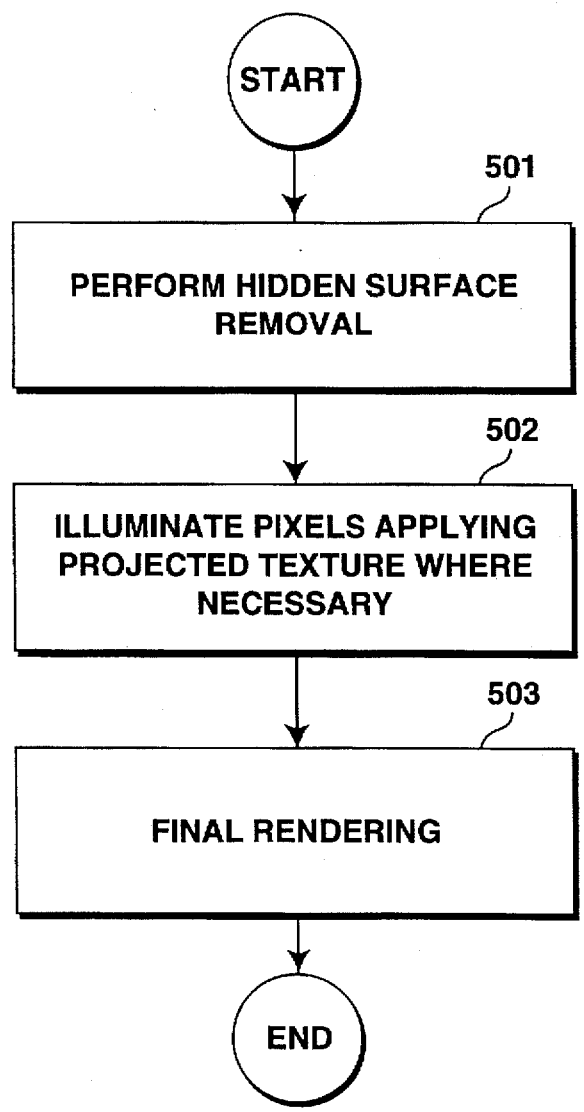
FIG. 5 is a flow chart illustrating the steps for performing projective texture mapping during rendering as may be performed in the currently preferred embodiment of the present invention.

FIG. 4 illustrates the relationship between the various coordinate systems. Referring to FIG. 4 a line segment 401 in a eye coordinate system and its projection onto a two-dimensional screen 410, are illustrated. The origin of the eye coordinate system is eye point 407.

The line segment 401 represents a span of a polygon being processed. The line segment has endpoints $Q_1$, 402 and $Q_2$ 403. A point on the line segment 401, e.g. point Q 404, may be found through an interpolation of the endpoints $Q_1$ 402 and $Q_2$ 403. Assuming that point Q 404 has eye coordinates (x,y,z,w), the corresponding screen coordinate is given by $(^x/_w, ^y/_w)$ at screen coordinate point 405.

Similarly, the point Q 404 will have coordinates $(x^1, y^1, z^1, w^1)$ in the light coordinate system. The light coordinate system has it's origin at light source point 408. The corresponding texture coordinates of texture map 409 are given by $(x^1/w^1, y^1/w^1)$ at texture map coordinate 406.

As discussed above, the goal is to find texture map coordinates given the screen coordinates. In eye coordinates, the endpoints of the line segment 401 are denoted by $Q_1$ 402 and $Q_2$ 403. The value are given by $$Q_1=(x_1, y_1, z_1, w_1) \text{ and } Q_2=(x_2, y_2, z_2, w_2).$$

A point Q 404 along the line segment is identified through linear interpolation and can be written in eye coordinates as $$Q=(1-t)Q_1+tQ_2 \qquad (1)$$

for some t $\in[0,1]$ (here t is a linear interpolation weighting value). In screen coordinates, we write the corresponding projected point as $$Q^s=(1-t^s)Q^s_1+t^sQ^s_2 \qquad (3)$$

wherein $Q^s_1=Q_1/w_1$ and $Q^s_2=Q_2/w_2$.

To find the light system coordinates of Q given $Q^s$, the value of t corresponding to $t^s$ (in general $t \neq t^s$) must be determined. This is accomplished by noting that $$Q^S = (1-t^s)Q_1/w_1 + t^sQ_2/w_2 = \frac{(1-t)Q_1+tQ_2}{(1-t)w_1+tw_2} \qquad (3)$$

and solving for t. This is most easily achieved by choosing screen coordinates a and b such that 131 $t^s=a/(a+b)$ and $t^s=b/(a+b)$. And eye coordinates A and B such that $(1-t)=A/(A+B)$ and $t=B/(A+B)$ are chosen.

$$Q^S = \frac{aQ_1/w_1+bQ_2/w_2}{(a+b)} = \frac{AQ_1+BQ_2}{Aw_1+Bw_2} \qquad (4)$$

It has been determined that $A=aw_2$ and $B=bw_1$ satisfy this equation, allowing determination of t corresponding to $t^s$ and thus Q.

Because the relationship between light coordinates and eye coordinates is affine (liner plus translation), there is a homogeneous matrix M that relates them:

$$Q^l = MQ = \frac{A}{A+B} Q_1^l + \frac{B}{A+B} Q_2^l \quad (5)$$

where $Q^1_1=(x^1_1, y^1_1, z^1_1, w^1_1)$ and $Q^1_2=(x^1_2, y^1_2, z^1_2, w^1_2)$ are the light coordinates of the points given by $Q_1$ and $Q_2$ in eye coordinates.

We finally obtain $$Q^t = Q^1/w^1 \quad (6)$$

$$= \frac{AQ_1^1 + BQ_2^1}{Aw_1^1 + Bw_2^1}$$

$$= \frac{aQ_1^1/w_1 + bQ_2^1/w_2}{a(w_1^1/w_1) + b(w_2^1/w_2)}$$

Equation 6 gives the texture coordinates corresponding to a linearly interpolated point along a line segment in screen coordinates. To obtain these coordinates at a pixel, the values $x^1/w$, $y^1/w$, and $w^1/w$, and $w^1/w$, are lineal interpolated and divided at each pixel to obtain $$x^1/w^1 = \frac{x^1/w}{w^1/w} \text{ and} \quad (7)$$

$$y^1/w^1 = \frac{y^1/w}{w^1/w}$$

If $w^1$ is constant across a polygon, then Equation 7 becomes $$s = \frac{s/w}{1/w} \text{ and} \quad (8)$$

$$t = \frac{t/w}{1/w}$$

where we have set $s=x^1/w^1$ and $t=y^1/w^1$. Equation 8 governs the iteration of texture coordinates that have simply been assigned to polygon vertices. It still implies a division for each pixel contained in a polygon. It is important that the more general situation of a projected texture implied by Equation 7 requires only that the divisor be $w^1/w$ instead of 1/w. Thus, the texture can be interactively scaled and manipulated to project onto different portions of the scene being rendered. Furthermore, since the projected texture is defined with a particular spatial reference, no manual assignment of texture coordinates to polygon vertices is necessary.

Generation of Shadowed Scenes

Shadowing is incorporated into the rendering process through the introduction of a shadow coefficient. The shadow coefficient indicates how much of a pixel is in shadow and is used to determine the contribution of each light source to yield a final color for the pixel. In the currently preferred embodiment, the shadow coefficient will be in the range [0,1] where a value of 1 indicates that the pixel is completely in shadow. As shadow "intensity" will vary depending on the distance from the light source and the number of light sources, it is necessary to account for such variables when calculating the shadow coefficient.

Figure 6A:
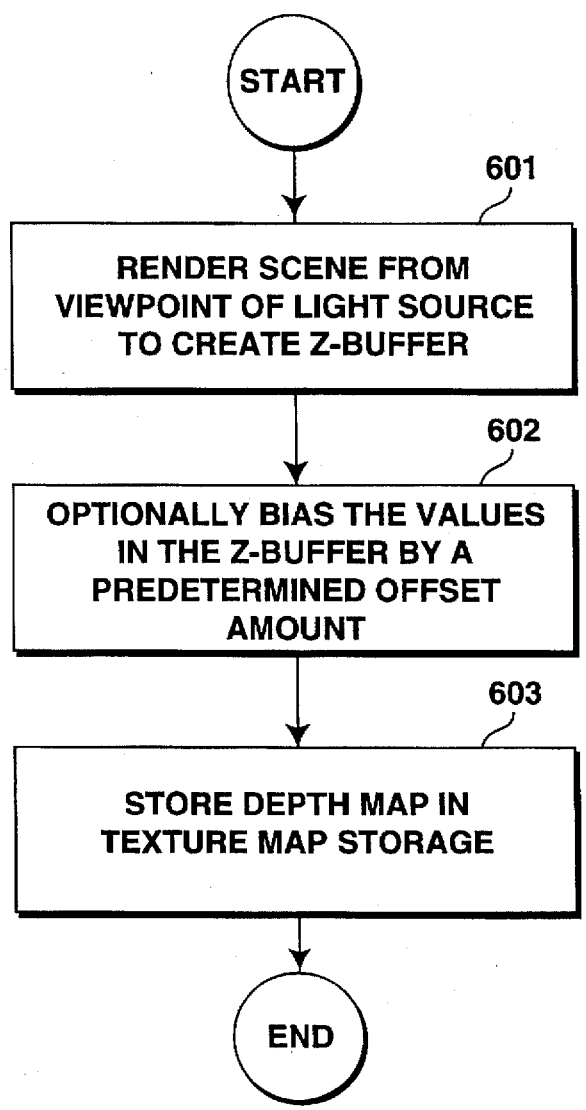
FIG. 6a is a flowchart illustrating the steps for generating a depth map used for generating shadowed scenes as may be performed by the currently preferred embodiment of the present invention.

Generating the shadow coefficient for a single light source is a two step process. For scenes with multiple light sources, the process is repeated for each light source. In the first step, a depth map is created. In the second step the depth map is used to generate the shadow coefficient for a light source and may be performed as the scene is rendered. The creation of a depth map is described with respect to the flowchart of FIG. 6a. First, an image of the scene is rendered form the viewpoint of the light source using a z-buffer hidden surface removal technique, step 601. The purpose of this rendering is to generate a z-buffer which contains depth values in light coordinates for the scene with hidden surfaces removed. The depth values are the values of $z^1$ at each pixel in the image. It should be noted that the z-buffer is initialized to contain sufficiently "high" values indicating extreme distances from the light source. Each of the values in the z-buffer may then be biased by a predetermined offset amount, step 602. As will be explained in more detail below, this step is optional. The z-buffer is then stored into a texture map storage for use as the depth map, step 603. The values in the depth map are referred to as depth map samples. Because the depth map is stored in texture map storage, the largest depth map can be as large as the largest texture map.

As noted above, the biasing step 602 is optional. The predetermined offset is an amount dependent on the slope of the distance function relative to the depth map indices (e.g. the slope of a triangle of which the pixel being rendered is part of.) Another way of describing the offset is that it is proportional to the rate of change of a depth map sample across each depth map sample position. It has been determined experimentally that this predetermined amount sufficiently approximates "fudge factors" which are typically manually introduced in order to provide accurate self shadowing. The depth map may still be used for shadowing without such a biasing, but at some sacrifice of realism. Alternatively, the offset may be added at a later point, e.g. during the iteration of pixels.

The result of the biasing is to cause the rendered objects to be pushed towards the light source and improve the realism of the rendered scene with regards to self shadowing objects. Generally, the offset is proportional to the rate of change of the depth coordinate across each depth map sample position. The offset is defined as K * max $$\left(\left|\frac{dz}{dx}\right|, \left|\frac{dz}{dy}\right|\right),$$

i.e. a user defined scaling factor K times the larger of the absolute values of $$\frac{dz}{dx} \text{ or } \frac{dz}{dy} \text{ ; where } \frac{dz}{dx}$$

is the rate of change of the depth coordinate in the x direction and $$\frac{dz}{dy}$$

is the rate of change of the depth coordinate in the y direction. Biasing by this means is an improvement over prior art such as Reeves, et al., which required the arbitrary scene dependent choice of bias values.

The generated depth map is used to create shadows in a multi-pass rendering process. Pass 1 produces a hidden surface-removed image of the scene using only ambient illumination. In pass 2, a shadow test is performed and a shadow coefficient generated. The tested values in pass 2 are: 1) a predetermined number of depth map samples retrieved from the depth map based on an iterated depth map index; and 2) an iterated depth coordinate of the pixel being rendered. The shadow coefficient is then set by comparison of the iterated depth map coordinate to each of the predetermined number of depth map samples. Generation of the shadow coefficient is the weighted average of the samples not in shadow relative to the iterated depth map index. Pass 3 draws the scene with full illumination, where portions of the scene that are in shadow remain dark as a function of the shadow coefficient. It would be apparent to one skilled in the art to combine various passes, e.g. pass 2 and pass 3, or to perform all functions in a single pass.

Figure 6B:
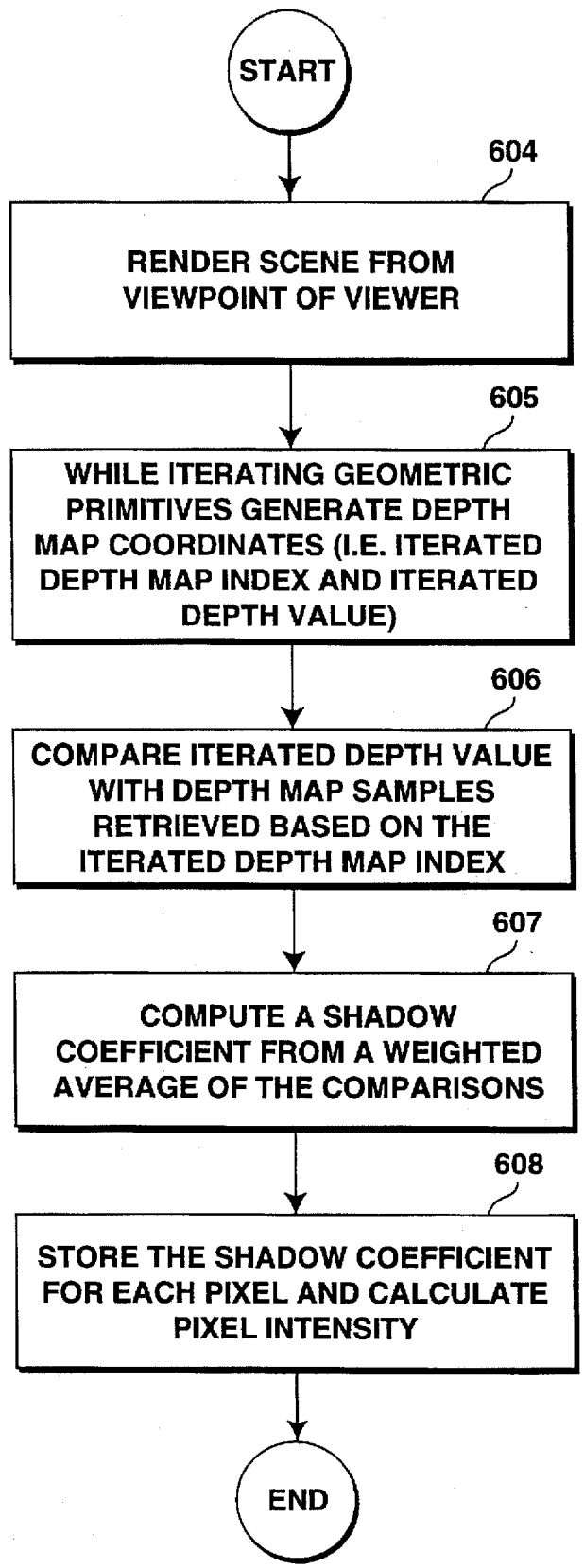
FIG. 6b is a flowchart illustrating the steps for generating shadow coefficients which are used for generating shadowed scenes, as may be performed by the currently preferred embodiment of the present invention.

FIG. 6b is a flowchart which illustrates the steps for generating the shadow coefficients in more detail. The scene is rendered from the viewpoint of the viewer, step 604. As the scene is rendered through iteration of geometric primitives, depth map coordinates are generated to index the depth map, step 605. In the currently preferred embodiment, since the depth map is stored in texture map storage, the depth map coordinates are generated as if they were texture map coordinates. In any event, these coordinates include both the two dimensional coordinates necessary to index the depth map (i.e. iterated depth map index) and an iterated depth value. The iterated depth value is exactly the light source to object distance as was calculated during generation of the depth map. As the objects are drawn the iterated depth value is compared with a plurality of depth map samples retrieved using the iterated depth map index, step 606. If the iterated depth value is farther from the light source than a retrieved depth map sample, than a portion of the corresponding pixel is potentially obscured and therefore in shadow. In any event, a shadow coefficient is generated based on a comparison of the depth map samples and the iterated depth value. In the currently preferred embodiment it is the four or sixteen closest coordinate values to the iterated depth map index that are compared. However, the use of other numbers of samples would not cause a departure from the spirit and scope of the present invention. The results of these comparisons are utilized to form a weighted average shadow coefficient from those depth map samples that are not in shadow. The shadow coefficient represents the degree to which the object point is shadowed from the light source by other objects in the scene, step 607. Generation of the shadow coefficient is described in more detail below. This value is then stored to form a shadow coefficient map of the scene, step 608. In the currently preferred embodiment, the shadow coefficient values are stored in a frame buffer. It would be apparent to one skilled in the art to utilize the shadow coefficient immediately (i.e. in the same pass) without storing for use in a later pass.

Figure 7:
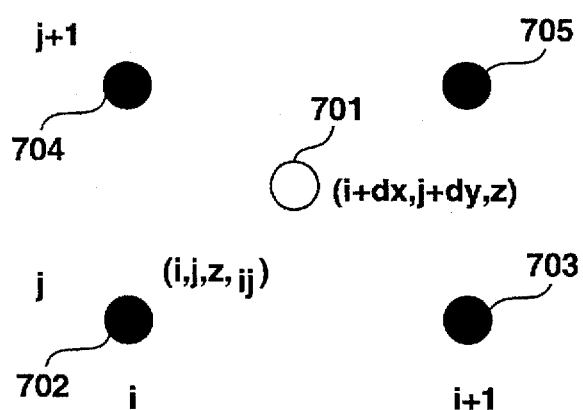
FIG. 7 illustrates an iterated texture map index point in relation to four (4) depth map samples as found in the currently preferred embodiment of the present invention.

As noted above, the shadow coefficient is generated by comparison to the four closest depth map samples to the iterated depth map value. The generation of a shadow coefficient is illustrated in FIG. 7. First, a formula for generating a shadow coefficient is given by $$\Sigma D_{ij} W_{ij}$$

where $D_{ij}$ is a binary value corresponding to depth map samples and $W_{ij}$ is a weight. The value $D_{ij}=1$ when $Z_{ij} < Z^*_{ij}$, i.e. the sample not in shadow, when the corresponding depth map sample is less than the iterated depth value $D_{ij}=0$ when $Z_{ij} >= Z^*_{ij}$ i.e. the sample is in shadow, when the corresponding the depth map sample is greater than or equal to the iterated depth map coordinate. Referred to FIG. 7, depth map coordinates 701 is indexed into a shadow map. The depth map coordinate has iterated depth map index (i+dx, j+dy) and iterated depth value $Z^x$. The dx and dy of the iterated depth map index corresponds to the fractional portions of the iterated values. In any event, the four closest samples 702-705 are denoted as having depth map coordinates of (i, j, $z_{ij}$), (i+1, j, $z_{i+1\ j}$), (i, j+1, $z_{ij+1}$) and (i+1, j+1, $z_{i+1\ j+1}$), respectively. The weights are then calculated as follows:

$$W_{ij} = (1-dx)(1-dy)$$
$$W_{i+1\ j} = dx(1-dy)$$
$$W_{ij+1} = (1-dx)dy$$
$$W_{i+1,\ j+1} = dxdy$$

In the event more than 4 samples are used, the samples are selected so that the depth map coordinate is in the "middle" of the samples.

Figure 8B:
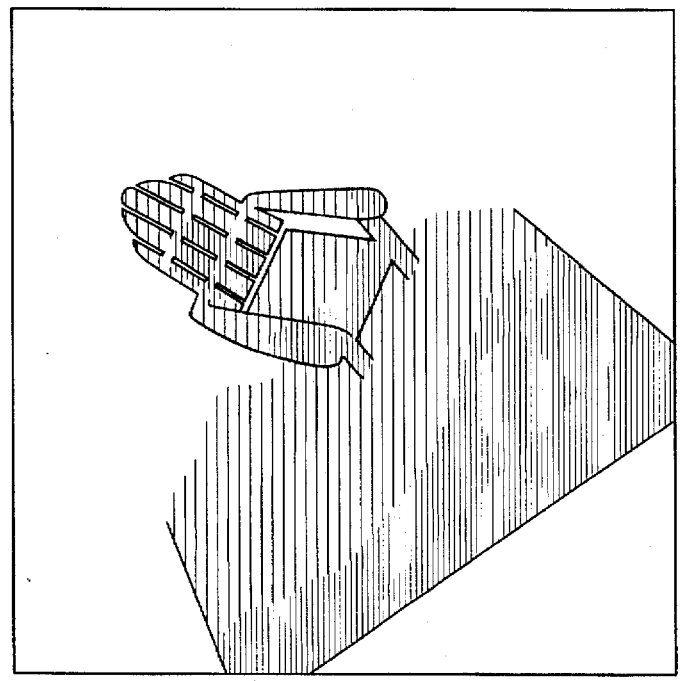
FIG. 8b is a graphical presentation of a shadow map as may be generated in the currently preferred embodiment of the present invention.
Figure 8A:
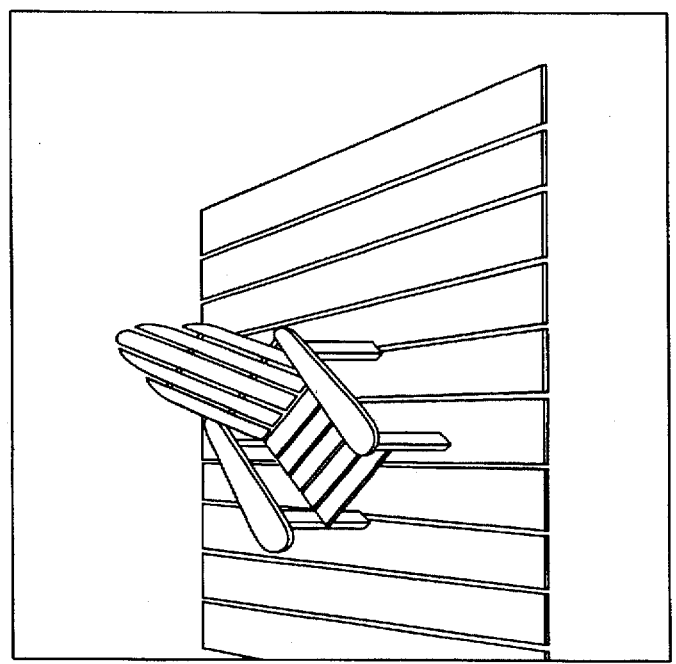
FIG. 8a illustrates a rendered scene as may be generated by a computer controlled graphics system of the currently preferred embodiment of the present invention.
Figure 8D:
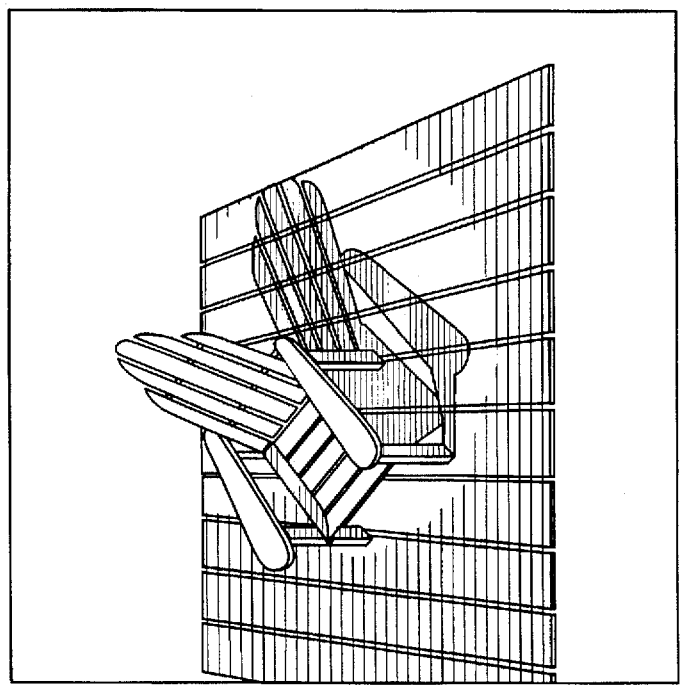
FIG. 8d illustrates the effect of a spotlight of FIG. 8c, shadowing the scene of FIG. 8a as may be performed in the currently preferred embodiment of the present invention.
Figure 8C:
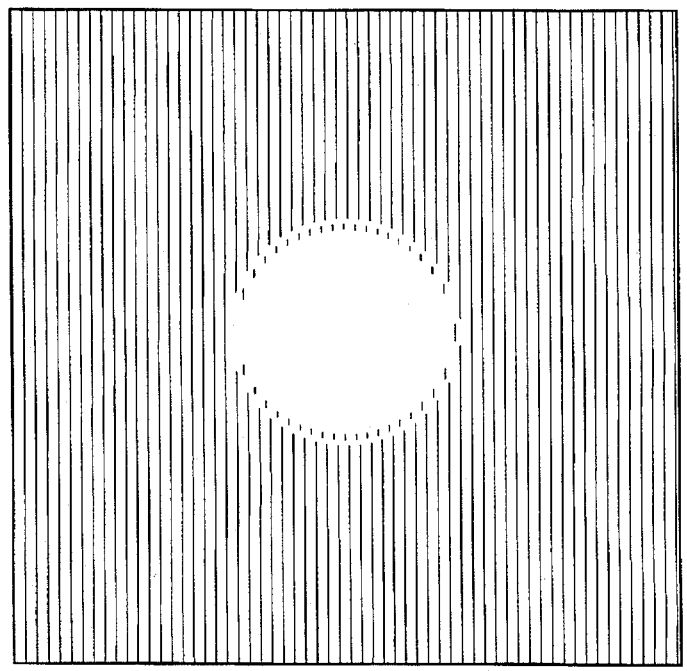
FIG. 8c is an example of a texture map as a cross section of a beam of light, for creating a spotlight effect, as may be utilized in the currently preferred embodiment of the present invention.

Shadowing may be combined with a texture corresponding to a cross section of the light source beam to create a spotlight effect. In this case, the depth map and projected texture will have the same origin point (i.e. the light source). As part of this process the light source to object distance function may be used to attenuate the light intensity due to distance and atmospheric effects. Shadowing a scene with respect to a light source beam is illustrated in FIGS. 8a-8d. FIG. 8a is an example of a scene (a chair) that may be generated and to which the spotlight and shadow are to be introduced. FIG. 8b graphically illustrates a depth map of the scene in FIG. 8a. FIG. 8c illustrates a spotlight intensity map which is utilized as the illumination source. FIG. 8d shows the results of incorporating both spotlight and shadow effects into the scene of FIG. 8a.

The shadow generation process has been described for a single light source but can be repeated for multiple light sources with optimizations possible for reducing the total number of rendering passes. When the scene is redrawn the shadow depth maps need not be regenerated if only the viewer is moving relative to the scene objects and light sources.

Thus, a method and apparatus for generating shadowed scenes in an interactive image generation system, is disclosed.

We claim:

1. In a computer controlled display system for displaying three dimensional scenes, each of said three dimensional scenes comprised of a plurality of graphical primitives, said graphical primitives represented by pixels on a display screen, a method for displaying shadows in a scene caused by a light source, said method comprising the steps of:

a) generating a depth map in a light coordinate system and storing said depth map in a texture map storage, said light coordinate system having said light source as an origin, said depth map storing in said texture map storage a plurality of depth map sample values, wherein each depth map sample value identifies a distance from a pixel location in one of said graphical primitives to said light source;

b) rendering said scene from the viewpoint of a viewer by processing each of said graphical primitives of said scene, said processing comprising the steps of:

1) identifying pixels corresponding to each of said graphical primitives;

2) for each pixel, determining if it is visible from said viewer's viewpoint;

3) ignoring pixels that are not visible;

4) for each pixel that is visible, generating a shadow coefficient, indicating the degree to which a pixel is in shadow, wherein each pixels shadow coefficient is used to shade said pixel, wherein said shadow coefficient for said pixel is generated by performing the steps of:

generating light system coordinates for said pixel using a projective texture mapping technique, said light system coordinates comprising a pixel depth map index for indexing said texture map storage and a pixel depth value;

retrieving a predetermined number of depth map sample values from said texture map storage based on said pixel depth map index;

comparing each of said predetermined number of depth map sample values to said pixel depth value; and using results of said comparison between said predetermined number of depth map sample values, and said pixel depth value to generate said shadow coefficient for said pixel and using said shadow coefficient to generate shading values for said pixel and displaying said pixel.

2. The method as recited in claim 1 wherein said step of generating a depth map in a light coordinate system is further comprised of the steps of:

h) rendering said scene from the viewpoint of said light source using a z-buffer technique to create a z-buffer of values in a z-buffer storage of said computer controlled display system; and i) storing said z-buffer as said depth map by transferring said z-buffer of values from said z-buffer storage into said texture map storage.

3. The method as recited in claim 2 wherein prior to said step of storing said z-buffer as said depth map, performing the step of biasing each depth map sample value by an offset, said offset being proportional to the rate of change of the depth map sample value in a predetermined direction across said depth map.

4. The method as recited in claim 1 wherein said step of retrieving a predetermined number of depth map sample values based on said pixel depth map index is further comprised of the steps of:

h) determining a location of said pixel depth map index within said depth map; and i) selecting said predetermined number of depth map sample values surrounding the location of said pixel depth map index.

5. The method as recited in claim 4 wherein said step of using results of said comparison between said predetermined number of depth map sample values and said pixel depth value to generate said shadow coefficient for said pixel comprises the steps of:

j) ignoring depth map sample values which are less than or equal to said pixel depth value;

k) for each depth map sample value that is greater than said pixel depth value, creating a weighted shadow factor of said depth map sample value based on the distance between said depth map sample value and said pixel depth map index location;

l) summing said weighted shadow factors as said shadow coefficient.

6. The method as recited in claim 5 wherein said predetermined number of depth map sample values is 1.

7. The method as recited in claim 5 wherein said predetermined number of depth map sample values is 4.

8. The method as recited in claim 5 wherein said predetermined number of depth map sample values is 9.

9. The method as recited in claim 5 wherein said predetermined number of depth map sample values is 16.

10. The method as recited in claim 5 wherein said predetermined number of depth map sample values is interactively set by a user.

11. In a computer controlled display system comprising interactive projective texture mapping means, said projective texture mapping means operating in a three dimensional (x, y, z) light coordinate system with a variably defined light source origin point, said projective texture mapping means for projecting a two dimensional texture map onto a three dimensional scene being rendered, said texture map indexed by (x, y) coordinates of said light coordinate system, said three dimensional scene comprising a plurality of graphics primitives, a method for rendering of scenes having shadows using said projective texture mapping means, said method comprising the steps of:

a) determining a position of a light source as the origin of said light coordinate system;

b) generating a depth map in said light coordinate system, said depth map storing a plurality of depth map sample values, wherein each depth map sample value identifies a distance from a pixel location in one of said graphics primitives to said light source;

c) storing said depth map for access as a texture map in a texture map storage;

d) for all pixels corresponding to one of said graphics primitives performing the steps of:

1) determining that a particular pixel is visible from a viewer's viewpoint;

2) performing a texture map look-up on said depth map for said particular pixel, said texture map look-up including generation of coordinates in said light coordinate system for said particular pixel using said projective texture mapping means; wherein said coordinates in said light coordinate system for said particular pixel comprise a pixel depth map index and a pixel depth value;

3) retrieving a plurality of depth map sample values from said depth map based on said pixel depth map index;

4) assigning a first binary value to each of said retrieved depth map sample values that is in shadow and a second binary value to each of said retrieved depth map sample values that is not in shadow based on a comparison with the pixel depth value;

5) generating a shadow coefficient for said particular pixel from said binary values, said shadow coefficient indicating the degree to which said particular pixel is in shadow;

6) using said shadow coefficient to generate shading values for said particular pixel and displaying said pixel using said shading values.

12. The method as recited in claim 11 wherein said step of generating a depth map in said light coordinate system is further comprised of the step of performing a z-buffer hidden surface removal operation for each pixel to create a z-buffer, wherein said z-buffer comprises said depth map.

13. The method as recited in claim 12 wherein said step of retrieving a plurality of depth map sample values from said depth map based on said pixel depth map index is further comprised of the steps of:

a) determining a location of said pixel depth map index within said depth map; and b) selecting said predetermined number of depth map sample values so that said location of said pixel depth map index is surrounded by said predetermined number of depth map sample values.

14. The method as recited in claim 13 wherein said step of assigning a first binary value to each of said retrieved depth map sample values that is in shadow and a second binary value to each of said retrieved depth map sample values that is not in shadow based on a comparison with the pixel depth value is further comprised of the steps of:

a) assigning said first binary value to said retrieved depth map sample value if said depth map sample value is less than said pixel depth value; and b) assigning said second binary value to said retrieved depth map sample value if said retrieved depth map sample value is greater than or equal to said pixel depth value.

15. The method as recited in claim 14 wherein said first binary value is 1 and said second binary value is 0.

16. The method as recited in claim 15 wherein said predetermined number of depth map sample values is 1.

17. The method as recited in claim 15 wherein said predetermined number of depth map sample values is 4.

18. The method as recited in claim 15 wherein said predetermined number of depth map sample values is 9.

19. The method as recited in claim 15 wherein said predetermined number of depth map sample values is 16.

20. The method as recited in claim 15 wherein said predetermined number of depth map sample values is interactively set by a user.

21. The method as recited in claim 11 wherein prior to said step of storing said depth map for access as a texture map, performing the step of biasing each depth map sample value by an offset, said offset being proportional to the rate of change of the depth map sample value across said depth map.

22. The method as recited in claim 11 wherein said step of using said shadow coefficient is further comprised of the steps of:

a) applying said shadow coefficient to a light source color to determine a light source contribution to pixel color intensity;

b) determining an ambient light color; and c) combining said light source contribution with said ambient light color to generate said shading values.

23. A computer controlled display system for interactive generation of shadowed scenes comprising:

a texture map storage;

a projective texture mapping means for generating a texture map index and a pixel depth value;

a z-buffering means for identifying surface points of a plurality of graphics primitives which are closest to a viewpoint;

a display means;

rendering means for rendering pixels based on a shadow coefficient, said shadow coefficient identifying the amount a pixel is in shadow, said display means coupled to rendering means to display said pixel;

shadow coefficient generation means coupled to said projective texture mapping means and said z-buffering means and to said rendering means, said shadow coefficient generation means for calculating said shadow coefficient, said shadow coefficient generation means further comprised of:

means for generating a depth map utilizing said z-buffering means, said depth map storing a plurality of depth map sample values, wherein each depth map sample value identifies a distance from a pixel location of a graphics primitive to a light source;

means for storing said depth map as a texture in said texture map storage;

means for utilizing said projective texture mapping means for accessing said depth map stored in said texture map storage;

means for identifying a predetermined number of depth map sample values based on said texture map index; and means for generating a weighted average from said predetermined number of depth map sample values said weighted average representing said shadow coefficient;

means for generating a shading value for said pixel, said means for generating being coupled to said display means for displaying said pixel.

24. The computer controlled display system as recited in claim 23 wherein said projective texture mapping means is further comprised of:

means for identifying a position of said light source;

means for assigning the position of said light source as the origin for a light coordinate system;

means for converting coordinates in a screen coordinate system to coordinates in said light coordinate system; and means for generating said texture map index from said coordinates in said light coordinate system.

25. The computer controlled display system as recited in claim 23 wherein said shadow coefficient generation means is further comprised of depth map bias generation means, said depth map bias generation means comprised of:

means for generating a unique offset for each entry of said depth map, said unique offset being proportional to the rate of change of the depth map sample values across said depth map; and means for applying the generated unique offset to the corresponding entry of said depth map.

26. In a computer controlled display system for interactively displaying three dimensional scenes, each of said three dimensional scenes comprised of a plurality of graphical primitives, said graphical primitives represented by pixels on a display screen, a method for displaying shadows in a scene caused by a light source, said method comprising the steps of:

A) generating a depth map in a light coordinate system and storing said depth map in a texture map storage, said light coordinate system having said light source as an origin, said depth map storing in said texture map storage a plurality of depth map sample values each identifying a distance from a pixel location in one of said graphical primitives to said light source;

B) biasing each depth map sample value by an offset, said offset being proportional to the rate of change of the depth map sample value in a predetermined direction across said depth map;

C) rendering said scene from the viewpoint of a viewer by processing each of said graphical primitives of said scene, said processing comprising the steps of:

1) identifying pixels corresponding to each of said graphical primitives;

2) for each pixel, determining if it is visible from said viewer's viewpoint;

3) ignoring pixels that are not visible;

4) for each pixel that is visible, generating a shadow coefficient indicating the degree to which a pixel is in shadow, wherein each pixel's shadow coefficient is used to shade said pixel, wherein said shadow coefficient for said pixel is generated by performing the steps of:

a) generating coordinates in said light coordinate system for said pixel texture mapping techniques, said coordinates comprising a pixel depth map index for indexing said texture map storage and a pixel depth value;

b) retrieving a predetermined number of depth map sample values from said texture map storage based on said pixel depth map index;

c) comparing each of said predetermined number of depth map sample values to said pixel depth value; and
d) using the results of the comparing step to generate a shadow coefficient for said pixel and using said shadow coefficient to generate shading values for said pixel and displaying said pixel using said shading values.

* * * * *